July 5, 1955 W. S. KIMBRO 2,712,457
BEARING ASSEMBLY FOR ROTARY SPRINKLERS
Filed Jan. 14, 1952
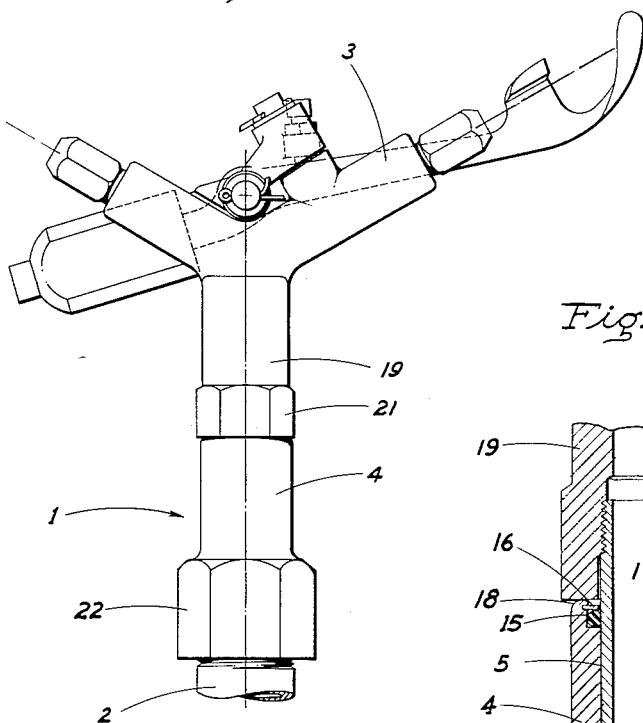
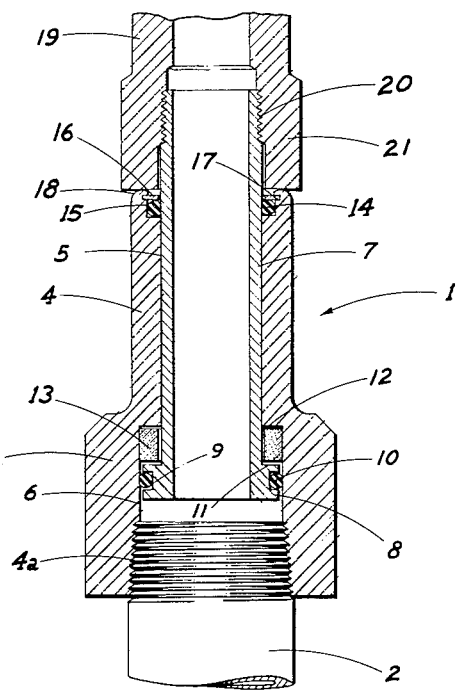
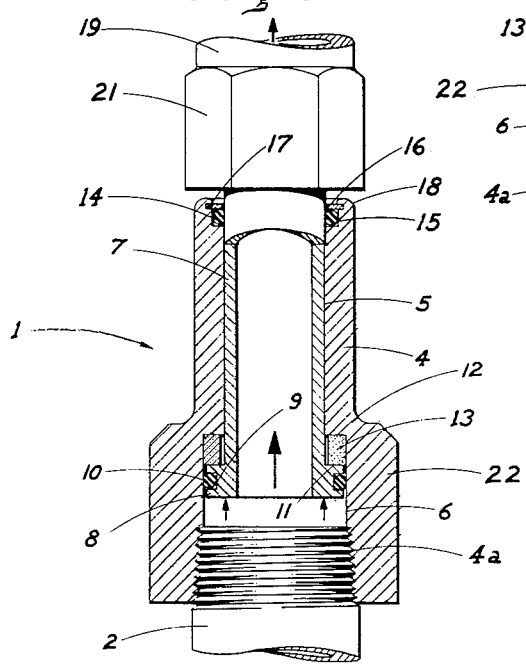
INVENTOR.
*William S. Kimbro*
BY
*Webster & Webster*
ATTORNEYS 2,712,457
Patented July 5, 1955

2,712,457
BEARING ASSEMBLY FOR ROTARY SPRINKLERS

William S. Kimbro, Fresno, Calif., assignor to Buckner Manufacturing Company, Fresno, Calif.

Application January 14, 1952, Serial No. 266,391

1 Claim. (Cl. 285—97.5)

The present invention is directed to, and it is a major object to provide, a novel bearing assembly adapted for connection between a water supply standpipe and a water jet actuated, rotary sprinkler head; the purpose of said bearing assembly being to support the sprinkler head for smooth unrestricted turning motion, while simultaneously delivering water to said head from the standpipe.

Another important object of this invention is to provide a bearing assembly, for rotary sprinklers, which has novel means to seal the included anti-friction thrust washer and the bearing spindle against access thereto by abrasive substances, such as sand or silt.

This is of substantial advantage, as sand or silt—if it obtains access to the bearing assembly of a rotary sprinkler—ultimately causes undue wear and the rotary sprinkler head will not rotate freely in response to the water jets emitting therefrom.

An additional object of the invention is to provide a bearing assembly, as in the preceding paragraph, wherein the sealing means includes resilient "O" rings in cooperative engagement between the relatively rotatable parts of the bearing assembly at points above and below the anti-friction thrust washer; the latter being a graphite composition, and it thus being essential that abrasive materials not reach it.

A further object of the invention is to provide a bearing assembly, for the purpose described, which permits of limited axial or end play of the rotary spindle, and which end play is desirable to assure of easy starting of the rotary motion of the sprinkler by water jet action.

It is also an object of the invention to provide a bearing assembly, for rotary sprinklers, which is designed for ease and economy of manufacture and assembly; the bearing assembly, when in use, giving long trouble-free service.

It is also an object of the invention to provide a practical and reliable bearing assembly for rotary sprinklers and one which will be exceedingly effective for the purpose for which it is designed.

These objects are accomplished by means of such structure and relative arrangement of parts as will fully appear by a perusal of the following specification and claims.

In the drawings:

Fig. 1 is an exterior elevation showing the bearing assembly as mounted between a standpipe and a rotary sprinkler head.

Fig. 2 is an enlarged fragmentary sectional elevation showing the internal structural arrangement of the bearing assembly; the parts being in their position of rest.

Fig. 3 is a similar view, but shows the parts when the rotary sprinkler is operating under water pressure from the standpipe.

Referring now more particularly to the characters of reference on the drawings, the bearing assembly is indicated generally at 1; such bearing assembly being mounted between a water supply standpipe 2 and a water jet actuated type, rotary sprinkler head 3; a head of this type being shown—for example, in copending application in the name of John A. Royer, Serial No. 144,649, on Sprinkler.

The bearing assembly 1 comprises an upstanding fitting 4 which is of tubular form, including an axial bore 5, which bore—in the lower portion thereof—is enlarged, as at 6.

An elongated, rotary spindle 7 of tubular form turns in the bore 5 with an easy running fit; the upper end of the spindle 7 projecting a distance above the corresponding end of the fitting 4, while the lower end of the spindle 7 projects into the enlarged portion 6 of the bore 5 but terminates some distance short of the lower end of said fitting to permit the upper end of the standpipe 2 to be threaded into said bore portion 6, as at 4a.

At the extreme lower end thereof the spindle 7 is formed with an integral, radially outwardly projecting annular flange 8, which flange has an annular or peripheral groove 9 cut therein.

An "O" ring 10 of resilient and compressible material is disposed in the annular groove 9 and bears under compression against the adjacent wall of the enlarged bore portion 6.

The upper surface of the flange 8 defines a shoulder 11 which lies in spaced facing relation to an annular shoulder 12 cut in the fitting 4 at the upper end of the enlarged bore portion 6.

An anti-friction thrust ring or washer 13, preferably of graphite, surrounds the spindle 7 in relatively loose-play relation between the facing shoulders 11 and 12. In the position of initial assembly, or the at-rest position of the parts, the anti-friction thrust ring or washer 13 has slight loose-play axially between the shoulders 11 and 12, as in Fig. 2.

Another "O" ring 14 of resilient and compressible material is disposed in an annular groove 15 cut in the fitting 4 near its upper end and opening to the bore 5; said ring 14 bearing against spindle 7.

The annular groove 15 is initially open to the upper end of the fitting 4 to permit of ready insertion of the "O" ring 14, and thereafter the top of said groove 15 is formed by a holding ring 16 shoulder-supported as at 17, with said ring secured in place by rolling or deforming the upper end of the fitting 4 over the ring, as at 18.

At its upper end the spindle 7 is threaded into the lower end of an attachment neck 19 which depends from the rotary sprinkler 3, as at 20. The threading engagement of these parts is such that the distance between the lower end of the attachment neck 19 and the shoulder 11 on the spindle 7 is slightly greater than the combined length of the fitting 4 from its upper end to the bottom face of the thrust washer 13 when the latter is raised to its uppermost position; i. e. raised into engagement with the shoulder 12.

The advantage of this specific dimensioning of the parts is of advantage, for the reason that although the weight of the rotary sprinkler head 3 may urge it downwardly—when not in use—so that the adjacent ends of the neck 19 and fitting 4 abut, as in Fig. 4, there is sufficient end-play for the spindle 7 to rise slightly when the rotary sprinkler is in use.

When water under pressure delivers from the standpipe 2 upwardly through the fitting 4 into the rotary sprinkler head 3, a pressure is exerted on the bottom of the annular flange 18, urging it—piston-like—upwardly, as indicated by the arrows in Fig. 3. This not only moves the flange 8 into engagement with the anti-friction thrust washer 13, but elevates the lower end of the attachment neck 19 a distance above the upper end of the fitting 4, so that there can be no drag engagement therebetween. As a result the rotary sprinkler head 3 has no resistance, from these parts, to easy starting when the water is first fed to the rotary sprinkler head 3.

When the rotary sprinkler head 3 is in operation, with water flowing under pressure upwardly through the bearing assembly 1, the "O" ring 10 provides an effective seal between the flange 8 and the fitting 4, thus assuring against the entry of sand or silt—which may be carried by the water—between the working parts of the assembly.

It is especially desirable that abrasive substances be prevented from gaining access to the relatively soft thrust washer 13, which is preferably of graphite.

The "O" ring 14 has a similar sealing action with the spindle 7, and prevents abrasive substances from gaining access into the bearing assembly 1 from exteriorly of the upper end of the fitting 4.

In addition to the bearing assembly being very effective in the prevention of access of abrasive substances to the working parts, such bearing assembly permits of easy and smooth functioning of the rotary sprinkler head 3.

The attachment neck 19, as at 21, and the fitting 4, as at 22, are formed exteriorly with nuts for wrench engagement, which facilitates connection of the bearing assembly 1 between the standpipe 2 and rotary sprinkler head 3.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention the following is claimed as new and useful and upon which Letters Patent are desired:

A water flow bearing assembly for connection between a standpipe and a rotary sprinkler head, comprising an upstanding fitting having an axial bore, the lower portion of the bore being enlarged to provide a downwardly facing annular shoulder intermediate the ends of the fitting, the wall of the enlarged bore portion being smooth surfaced adjacent the shoulder and arranged at its lower end for connection to a standpipe, a tubular spindle rotatably engaging the upper bore portion of the fitting and projecting above and below the same, the upper end of the spindle being arranged for attachment to a sprinkler head, an enlarged annular flange on the spindle below and spaced from the shoulder, a seal ring mounted in a groove in the flange and engaging the smooth wall of the enlarged bore portion, and a graphite thrust washer about the spindle in spaced relation thereto and closely fitted in said enlarged bore portion between and engaging the shoulder and the adjacent upper face of the flange.

References Cited in the file of this patent

UNITED STATES PATENTS

| Number | Name | Date |
| --- | --- | --- |
| 1,911,423 | Biller | May 30, 1933 |
| 1,996,899 | Buckner | Apr. 9, 1935 |
| 2,402,224 | Hornbostel | June 18, 1946 |
| 2,485,504 | Morgan | Oct. 18, 1949 |
| 2,521,248 | Parker | Sept. 5, 1950 |
| 2,462,006 | Schmitter | Feb. 15, 1949 |